Dec. 30, 1952 P. JEANLIN 2,623,949

TWO-WAY LOUD-SPEAKER TELEPHONE INSTALLATION

Filed June 1, 1950 3 Sheets-Sheet 1

Pierre Jeanlin
by Christy, Parmelee & Strickland
his attorneys

Dec. 30, 1952 P. JEANLIN 2,623,949

TWO-WAY LOUD-SPEAKER TELEPHONE INSTALLATION

Filed June 1, 1950 3 Sheets-Sheet 2

Pierre Jeanlin by Christy, Parmelee & Strickland his attorneys

Dec. 30, 1952 P. JEANLIN 2,623,949

TWO-WAY LOUD-SPEAKER TELEPHONE INSTALLATION

Filed June 1, 1950 3 Sheets-Sheet 3

Pierre Jeanlin
by Christy, Parmelee & Strickland
his attorneys

Patented Dec. 30, 1952

2,623,949

UNITED STATES PATENT OFFICE 2,623,949

TWO-WAY LOUD-SPEAKER TELEPHONE INSTALLATION

Pierre Jeanlin, Paris, France, assignor to Societe Le Teleampliphone, Paris, France Application June 1, 1950, Serial No. 165,450
In France June 8, 1949

8 Claims. (Cl. 179—1)

In my United States patent application Serial No. 38,057, filed July 10, 1948, now Patent No. 2,545,466, for "Two-way loud speaker telephone installation" I have described circuits which permit of avoiding the Larsen effect in two-way loud speaker telephone installations by the utilization of an "intermediate high frequency" which disengages the over-amplification in a line only after blockage of the other line under the effect of the amplified and rectified microphonic modulation.

The principle of the invention above referred to consists in using a high frequency oscillator, the high frequency tension of which is rectified, to produce a negative tension of polarization adapted for braking amplifiers to inactivity. Each amplifier has its oscillator. The amplified modulation by an auxiliary amplifier or by the amplifier which controls the loud speaker is then rectified and blocks the oscillator by negative injection upon an electrode of the oscillator tube. This being blocked suppresses in its turn the negative tension which brakes the amplifier and the amplification becomes maximum.

The advantages of that method are the separation of over-amplification and modulation circuits, the reduction of time constants by reason of weak uncouplings required by the high frequency, and the instantaneous passing from weak gain to strong gain.

In this circuit, nevertheless, the blockage properly so called remains effected by polarization at the cut-off of a valve of the adverse amplifier or of the excitation valve of the loud speaker or microphone: One retains therefore the risk of remounting of modulation from one amplifier to the other whence arises the necessity for efficacious uncouplings which would augment the time constants and reduce also the benefit obtained in the over-amplification circuits.

The present invention remedies this drawback and moreover provides other advantages:

It accomplishes the absolute separation of the circuits of modulation, blocking and over-amplification, avoiding also the remounting of modulation from one amplifier to another; security is augmented and the power can be much greater.

It reduces the time constants owing to the utilization of an intermediate high frequency requiring only weak uncoupling.

It permits the suppression of the complex valve which was required for blocking by negative injection upon special electrodes and which comprised an electrode of over-amplification, a blocking electrode and modulation electrodes.

It permits of augmenting the power of delivery; it is possible in effect to diminish the sensitiveness in repose, since the passage from weak gain to strong gain is practically instantaneous.

The quality of audition is improved since it is possible to operate the valves at stable characteristics; once unblocked, the amplifier is comparable to a normal one-way amplifier of any power and of desirably advanced quality.

The present invention has for object a symmetrical two-way loud speaker telephone installation comprising two stations, in which each way comprises a line connecting the microphone of one station to the loud speaker of the second station, a first transformer fed by the said microphone, a first amplifier valve of which the first grid is connected to the secondary of the said transformer, a second amplifier valve coupled in a known manner to the first, a second transformer the primary of which is connected to the anode of the second amplifier valve as well as to the high tension feed and to the screen of the second valve, the loud speaker of the second station being connected to the secondary of the second transformer, characterized by the combination with these elements of a condenser in shunt upon the connection between the anode of the second amplifier valve and the second transformer, a rectifier connected between the outlet of this condenser and an earth, a multi-grid high frequency oscillator comprising first and second grids, a connection between the entry of the rectifier and the second grid of the oscillator, a resistance in shunt between this connection and an earth, a filter inserted in the said connection, means for causing the oscillator to oscillate at the desired frequency, a circuit between the oscillator and the secondary of the first transformer for applying to that secondary the high frequency of the oscillator, and means for rectifying and filtering the frequency of the oscillator and applying the positive tension obtained to the screen of the first amplifier valve of the second way.

In a first mode of carrying out the invention the oscillator is a single tri-grid-triode, the first grid of which is connected to one of the windings of the corresponding oscillating circuit across a condenser and to earth across a resistance in series with a potentiometer the cursor of which is connected to the secondary of the first transformer.

The screen of the anode of the tri-grid element (or first anode) is connected directly to the high tension feed, whereas this first anode is so connected through the intermediary of a second winding the coupling of which with the winding mentioned in the first place is variable for regulating the frequency. The grid of the triode element is connected to the first grid of the tri-grid whilst its anode is connected to the high tension feed across a resonant circuit; this second anode is connected on the other hand to the screen of the first amplifier valve of the second way by a circuit identical to that which connects the anode of the second amplifier valve of the first way to the second grid of the oscillator.

In a second mode of carrying out the invention, the oscillator is composed of two separate valves, a pentode and a triode. The anodic tension coming from the second valve of the amplifier, rectified and filtered, is applied to the second grid of the pentode, the first grid being connected, as in the first case, to the oscillating circuit, and the anode as well as the screen being connected to the high tension feed as previously. But a shunt taken in front of the entry of the second grid ends, across a suitable arrangement giving a positive polarization (for example, a battery), at the grid of the triode the anode of which is connected to the high tension feed, whilst the cathode is connected to earth across a resistance uncoupled by a condenser, the entry of this resistance being connected to the screen of the first amplifier valve of the second way.

According to a modification, the oscillator is constituted by a single valve, for example of the type ECH 21, as in the first case, but the plate of the triode element is connected, on the one hand, directly to the screen of the first amplifier valve of the second way and, on the other hand, to the high tension feed across a resistance uncoupled by a condenser.

In another modification, the rectifiers which act upon the oscillators are fed by means of amplifiers distinct from line amplifiers and shunted, for example, upon the secondary of transformers fed by the microphones.

The annexed drawings illustrate diagrammatically and by way of example different modes of carrying out the invention.

Figure 1:
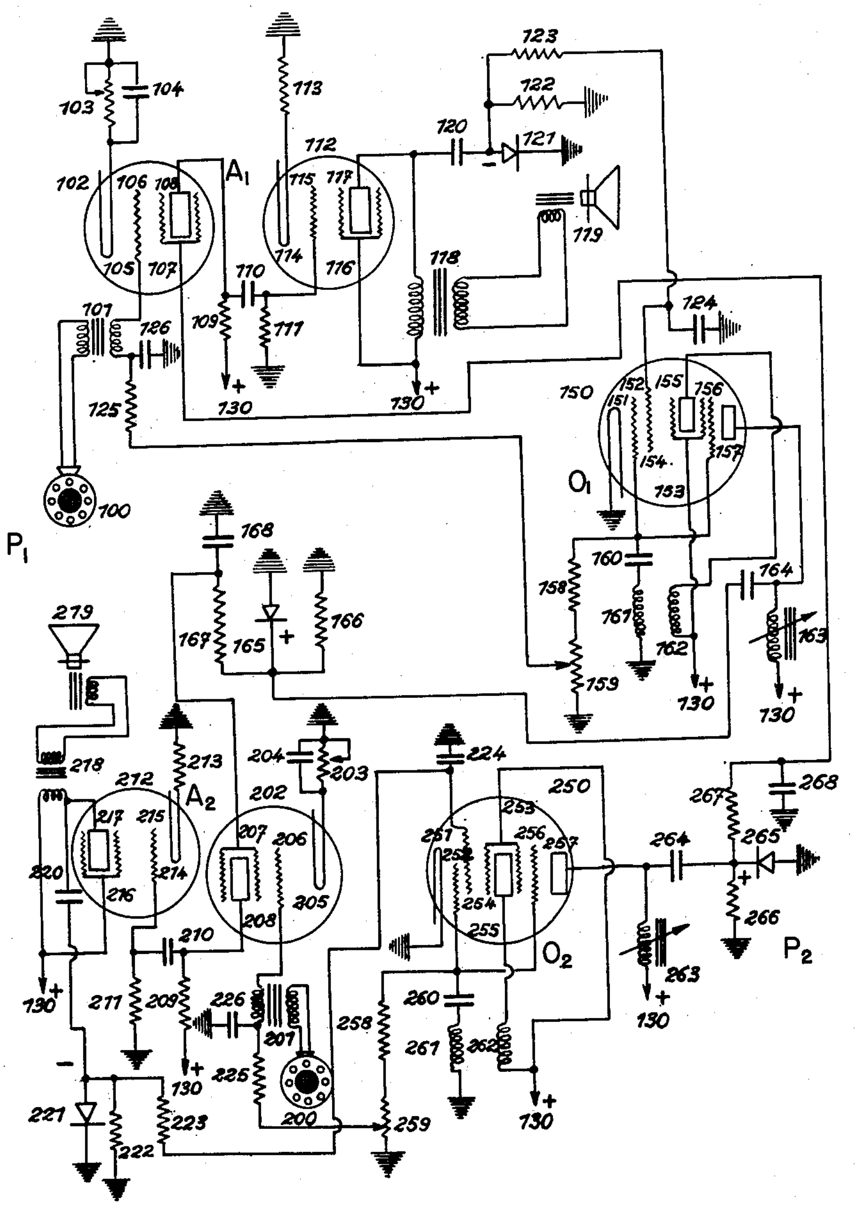
Figure 1 illustrates the first mode.

In the drawings it will be seen that, as in the U. S. A. patent application above referred to, there exists an intermediate high frequency which procures the braking tension of the amplifier at work by rectification of the high tension frequency.

But here the same intermediate high frequency procures also the blockage of the adverse amplifier.

For this purpose, the high tension frequency in positive is also rectified, and the positive tension obtained serves to feed an electrode of a tube of the amplifier to be blocked. When the oscillator stops, one suppresses simultaneously the positive tension of the amplifier at rest and the negative tension which brakes the amplifier at work.

Practically it is necessary:

(1) To amplify the high frequency tension in front of the rectifier in positive in order to obtain a sufficient tension;

(2) To cause the high frequency oscillator "in blocking" to work in order to obtain an instantaneous functioning (blocking at ultra-audible frequency);

(3) To employ for blocking an electrode with small output, the screen of the entry valve for example.

(4) If the blocking amplifier is independent of the modulating amplifier, it is evidently necessary also to block a valve of each amplifier.

In Figure 1, it is seen that the installation comprises two stations, which, in this description, will be called for greater simplicity "$P_1$" and "$P_2$." The elements of the installation in the direction from $P_1$ towards $P_2$ are hereinafter designated by numerals commencing with 100, and the corresponding elements in the direction from $P_2$ towards $P_1$ by numerals commencing with 200.

The two ways between the stations are symmetrical.

$P_1$ comprises a microphone 100 and a loud speaker 219, and $P_2$ comprises a loud speaker 119 and a microphone 200. In each line there are intercalated a two-valve amplifier and a high frequency oscillator. These amplifiers and oscillators, for simplicity, will respectively be called "$A_1$" and "$O_1$" (direction $P_1$ to $P_2$) and "$A_2$" and "$O_2$."

$A_1$ is composed of two tetrodes 102 and 112, and $O_1$ is constituted principally by a tri-grid triode 150, for example of the type ECH21, associated with an oscillating circuit 160, 161, 162. $A_2$ and $O_2$ have a similar constitution. $O_1$ and $O_2$ serve intermediate high frequency and provide the tensions for polarization and screen feed.

The microphone 100 influences the grid 106 of the valve 102 through the medium of transformer 101. The grid 106 is normally at earth potential through the secondary winding of 101, the resistance 125 and the potentiometer 159, supposing that the valve 150 does not oscillate in high frequency upon the windings 161 and 162. The polarization of the valve 102 is then assured by the potentiometer 103 inserted in the circuit of the cathode 105. 103 is uncoupled by a condenser 104 and determines by its regulation the sensitiveness of the amplifier $A_1$. The potential of the screen 107 is furnished by a rectifier 265 fed by $O_2$ by way of the filter 266—267—268. The anode 108 is connected to the high tension feed source 130 by way of resistance 109. The valve 102 is coupled to the valve 112 by the condenser 110 which is connected to the grid 115, itself at earth potential through the resistance 111. The valve 112 is polarized correctly by the resistance 113 inserted in the circuit of the cathode 114. The screen 116 is connected to the high tension feed 130; the anode 117 is also connected to it but by way of the primary of a transformer 118 which influences the loud speaker 119 of the station $P_2$.

In shunt on the connection between the anode 117 and the transformer 118, there is a condenser 120 which influences the rectifier 121 in the desired manner for giving a negative tension to the terminals of the resistance 122; this tension is filtered by 123–124 and is applied to the grid 154 of the valve 150 of the oscillator $O_1$. In this oscillator $O_1$, the valve 150 is a tri-grid triode the cathode 151 of which is at earth potential. Its first grid 152 is connected to a winding 161 of the oscillator by way of a condenser 160 and to earth by way of the resistance 158 and the potentiometer 159. The screen 153 of the first anode (that of the tri-grid element) is connected to the source 130; the anode 155 is similarly connected, by way of the winding 162 of the oscillator; the windings 161 and 162 are coupled and branched in the desired sense for producing oscillation of 150 on any frequency determined by the characteristics of the windings 161 and 162. The grid 156 of the triode element is connected to the grid 152 of the tri-grid element; its anode 157 is connected to the source 130 by way of a resonant circuit 163 and influences a rectifier 165 by way of a condenser 164. The positive tension obtained at the terminals of the resistance 166 is filtered by 167—168 and applied to the screen 207 of the valve 202 in the amplifier $A_2$.

Figure 2:
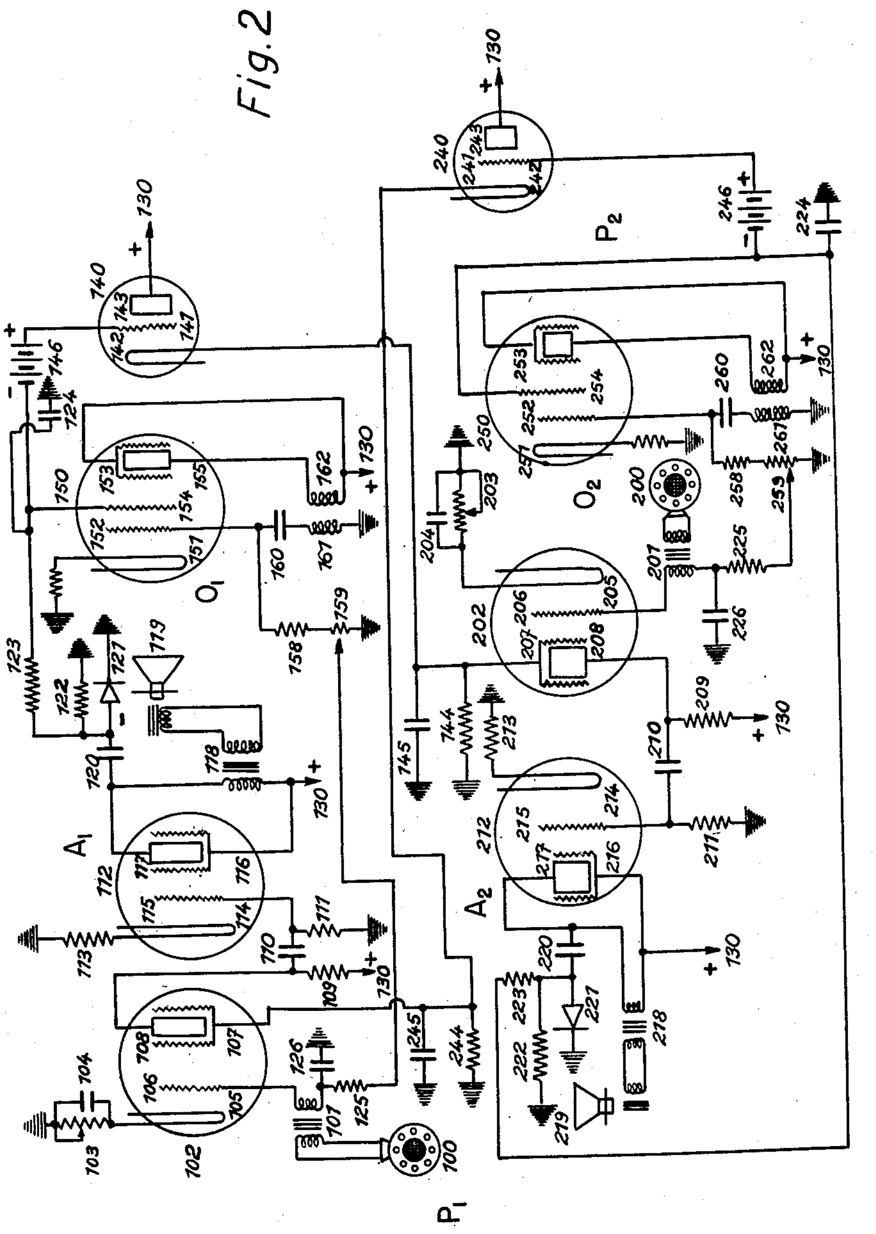
Figure 2 illustrates the second mode.

The amplifier $A_2$ is symmetrical with $A_1$ and comprises the same circuits and devices with the figure 2 for the hundreds. It is therefore unnecessary to describe it particularly.

The functioning of the installation is as follows:

In the absence of conversation, the oscillators $O_1$ and $O_2$ function. The high frequency to the terminals of 161 is rectified by the elements 152—151 for applying a negative tension to the resistance 158 and to the potentiometer 159. A part of that tension is taken from 159 for polarizing the grid 106 of the valve 102 and thus to reduce the gain of $A_1$ to a value inferior to that which would cause the initiation of the Larsen effect.

The amplifier $A_2$ is braked in the same manner by the grid 206 of the valve 202 by way of the transformer 201, the resistance 225 and the potentiometer 259 of $O_2$.

On the other hand, the high frequency of $O_1$ is also applied to the grid 156 of the triode element and it is amplified upon the anode 157 and rectified at 165 to feed the screen 207 of the valve 202 of $A_2$ by way of the resistance 167. In $A_1$ the screen 107 of 102 is fed in the same manner, as has been said above, by way of the resistance 267, by the rectifier 265 which rectifies in positive the high frequency amplified by the triode element 256—257 of 250 in $O_2$.

Thus, in repose, the two amplifiers $A_1$ and $A_2$ are normally fed with screen tension but are braked by their control grids 106 and 206. The valves 102 and 202 are evidently of variable gradient.

When there is speech before the microphone 100, the modulation comes feebly to the loud speaker 119 and at the same time is rectified by 121 and applies to the grid 154 of 150 a negative tension which causes stoppage of the high frequency oscillation; this disappearance of the high frequency suppresses at the same time the rectified positive tension which feeds the screen 207 of 202 and the negative tension which brakes 102 by its grid 106. $A_2$ is blocked and the amplification of $A_1$ is augmented. The time constants are very small and when speech ceases before the microphone 100 it is possible to speak before the microphone 200 following the same process.

Figures 3, 4:
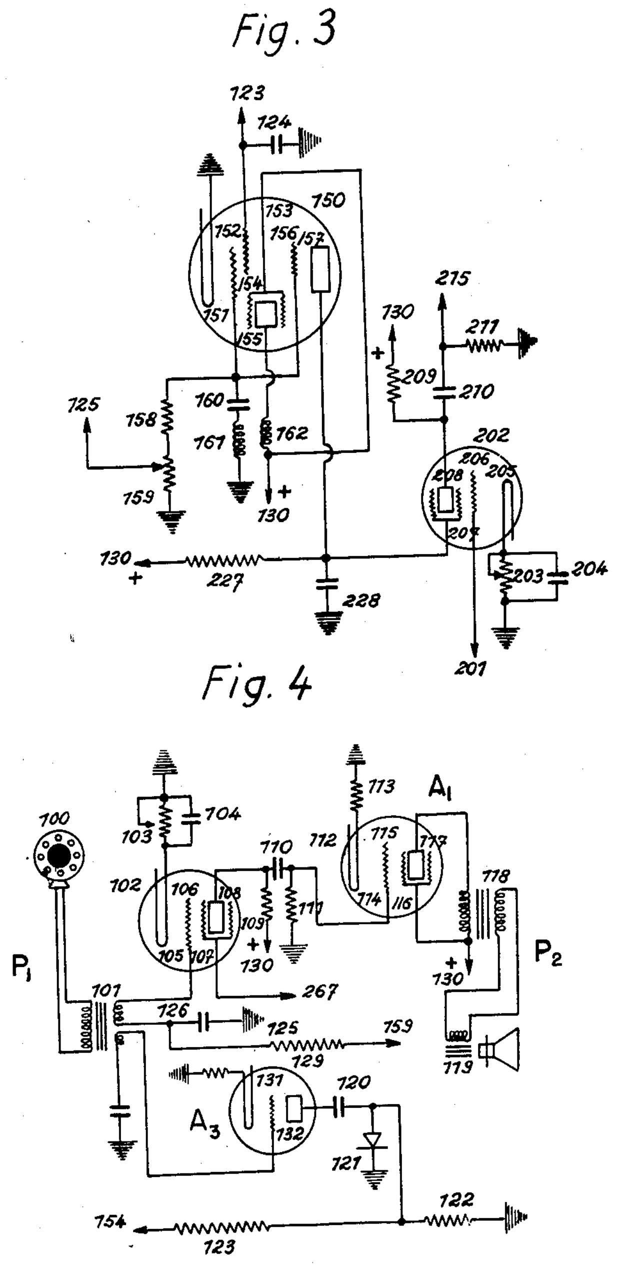
Figure 3 is a diagram of a partial variant of the first arrangement.
Figure 4 is a diagram of another detail of a variant.

In a variant shown diagrammatically in Figure 4, the rectifiers 121 and 221 are fed by means of separate amplifiers which, for simplicity, will be called "$A_3$" and "$A_4$" and which are distinct from $A_1$ and $A_2$. The amplifiers $A_3$ and $A_4$ are shunted upon 101 and 201. In effect, in the case of Figure 1, the rectifiers 121 and 221 are submitted to the over-amplification of the amplifiers $A_1$ and $A_2$ which feed them, which may be troublesome in certain cases.

In Figure 4, it will be seen that the amplifier $A_3$ is constituted by a triode 129 whose grid 131 is connected to one secondary of the transformer 101 which has, in this case, three windings. The anode 132 of the amplifier 129 feeds the rectifier 121 as in Figure 1. It is the same for the amplifier $A_4$ and the rectifier 221 not shown.

An arrangement of this kind is described in greater detail in the U. S. A. patent application above referred to.

It is to be noted that the frequencies of oscillation of $O_1$ and $O_2$ may be of any value; further the more elevated they are the more easily they will be filtered.

On the other hand the oscillators $O_1$ and $O_2$ should function in blocking, that is to say they should superpose on the high frequency a much lower oscillation, chosen in the ultra audible band so as not to interfere with the conversation. This ultra-audible frequency imposes a rhythm of blocking which permits instantaneous blocking when the negative tension of permanent blocking is applied upon the auxiliary grid of the valve 150 or 250. Without this expedient, there is produced an effect of "trainage" which renders the installation unusable in practice by reason of a too considerable lengthening of the time constants.

The resonance circuits 163 and 263 can be tuned either on the high frequency component of oscillation, or preferably on the ultra-audible low frequency component above referred to. The latter will give in effect more important rectified tensions by reason of its saw-tooth form more rich in harmonics.

The circuit in Figure 2 is another possible arrangement, in which the intermediate high frequency is maintained only for over-amplification, which functions as in the arrangement above described and need not therefore be described again.

On the contrary, if the blocking is done also by suppression of the screen tension of a valve of the adverse amplifier, that tension is not provided by the oscillator $O_1$ but by the source of high tension 130 by way of a triode 140 the grid of which is connected to the grid 154 of the valve 150 in the oscillator $O_1$ through the medium of any system of polarization, for example a pile 146 uncoupled by a condenser 124 and resistance 123. In this manner, the same tension which blocks $O_1$ will block the triode 140 and suppress the current of the screen 207 of the valve 202 thus putting the amplifier $A_2$ out of action.

The amplifier $A_1$ can be put out of circuit in the same manner by feeding the screen 107 of the valve 102 by way of a triode 240 the grid 241 of which is connected to the grid 254 of the valve 250 in the oscillator $O_2$.

The oscillators $O_1$ and $O_2$ no longer have the triode element but it requires two supplementary triodes for ensuring blocking.

The valve 140 functions as a valve having a control electrode 141. The anode 143 is connected to the source of high tension positive 130; the cathode 142 returns to earth through the resistance 144 uncoupled by 145.

The valve 240 is symmetric.

In practice, the triode 140 (or 240) constitutes a variable resistance following the modulation. This resistance can take an infinite value for a given polarization of the grid 141 and thus cuts off all feed of the screen 207 of 202. But in the absence of tension on 141, the anodic current of 143 traverses the resistance 144 and determines the appearance of a positive tension at the terminals of 144. This positive tension feeds the screen 207 of the valve 202. On the contrary, when 141 becomes sufficiently negative, the anodic current of 140 is suppressed; 207 takes the potential of the earth through 144 and 202 no longer amplifies.

It will be noted that the valves 140 and 240 can be more or less complex valves to permit of obtaining the desired tension; but it will always be indispensable to insert in the circuit of 141 (or 241) a positive polarization provided by 146 (or 246) which will partially annul that which 144 (or 244) applies automatically to the cathode of the valve 140 (or 240).

It will further be noted that this circuit can be applied to any other two-way telephone system, with or without intermediate high frequency.

Figure 3 illustrates a variant of Figure 1 in that the feed of the screen 207 of the blocking valve 202 is from the high tension 130 by way of a resistance 227 uncoupled by a condenser 228 with a common point at the plate of the triode 157 of the oscillator 150 which is of the type ECH21. The grid 156 of the triode element is connected to the grid 152 and is therefore polarized at the cut-off; only the intensity of the current of the screen 207 exists in the load resistance 227, which has the desired value for giving a feed tension corresponding tto the correct functioning of the valve 202. When $O_1$ ceases to oscillate, the negative tension at 152 and 156 which annuls the current of 157 disappears and the triode element of 150 being no longer cut-off, a current appears in the anode 157. This current is added to that of 227 and reduces the tension of the screen 207 until suppression of the amplification of 202. It will be understood that the second line or way which is not illustrated is symmetrical with that above described.

What I claim is:

1. A telephonic communicating system comprising in combination, a pair of lines, each of said lines comprising electronic-tube amplifier means comprising a pair of tubes in cascade, said amplifier means having an input grid circuit to a first of said tubes and an output anode circuit from a second of said tubes, said input circuit comprising a signalling device comprising a microphone and a transformer, said output circuit comprising a speaker means, a self-excited tube-oscillator having a frequency-determining circuit, biasing circuit means for deriving rectified energy from the oscillating energy of said tube oscillator and applying said rectified energy to said input circuit for decreasing amplification, a capacitor-rectifier circuit electrically connected between said output anode circuit and said tube-oscillator for applying a bias for discouraging oscillation of said tube-oscillator in response to a signal in said output anode circuit, the first of said tubes for each of said lines having a control grid and screen grid, each of said lines having its signalling device and biasing circuit means electrically connected to said control grid of said first tube of the corresponding line, and a rectifying biasing circuit for each of said lines extending from said tube-oscillator of the associated line to said screen grid of said first tube of said amplifier means of the other line.

2. A telephonic communicating system as defined in claim 1 but further characterized by said tube-oscillator of each of said lines comprising a tube having a plurality of electrodes including a plurality of grids, and said biasing circuit means of each of said lines comprising a pair of grids of the corresponding tube-oscillator.

3. A telephonic communicating system as defined in claim 2 but further characterized by said rectifying biasing circuit of each of said lines comprising a pair of electrodes of said tube of the corresponding tube-oscillator.

4. A telephonic communicating system comprising, in combination, a plurality of stations including a first station and a second station; said first station comprising a first speaker means, and a first electronic-tube amplifier means comprising a pair of amplifier tubes in cascade, said first amplifier means having an input grid circuit to a first of said tubes and an output anode circuit from a second of said tubes, said second station comprising a second speaker means, and a second electronic-tube amplifier means comprising a pair of amplifier tubes in cascade, said second amplifier means having an input grid circuit to a first of the last said tubes and an output anode circuit from the second of the last said tubes; each of said input grid circuits comprising a signalling device comprising a microphone and a transformer; said first speaker means being connected in said output anode circuit of said second amplifier means; said second speaker means being connected in said output anode circuit of said first amplifier means; a first capacitor-rectifier series circuit connected to said output anode circuit of said first amplifier means; a second capacitor-rectifier series circuit connected to said output anode circuit of said second amplifier means; said first station comprising a first tube-oscillator comprising a first oscillator tube having at least three grids, and a frequency-determining circuit connected thereto; said second station comprising a second tube-oscillator comprising a second oscillator tube having at least three grids, and a frequency-determining circuit connected thereto; a first bias circuit connected to said first series circuit and a grid of said first oscillator tube; a second bias circuit connected to said second series circuit and a grid of said second oscillator tube; said first tube of each of said amplifier means comprising a screen grid; a first means for deriving a rectified potential from said first tube-oscillator and applying said potential to said input grid circuit of said first amplifier means and a second means for deriving a rectified potential from said second tube-oscillator and applying it to said input grid circuit of said second amplifier means.

5. A telephonic communicating system comprising, in combination, a plurality of stations including a first station and a second station; said first station comprising a first speaker means, and a first electronic-tube amplifier means comprising a pair of amplifier tubes in cascade, said first amplifier means having an input grid circuit to a first of said tubes and an output anode circuit from a second of said tubes, said second station comprising a second speaker means, and a second electronic-tube amplifier means comprising a pair of amplifier tubes in cascade, said second amplifier means having an input grid circuit to a first of the last said tubes and an output anode circuit from the second of the last said tubes; each of said input grid circuits comprising a signalling device comprising a microphone and a transformer; said first speaker means being connected in said output anode circuit of said second amplifier means; said second speaker means being connected in said output anode circuit of said first amplifier means; a first capacitor-rectifier series circuit connected to said output anode circuit of said first amplifier means; a second capacitor-rectifier series circuit connected to said output anode circuit of said second amplifier means; said first station comprising a first tube-oscillator comprising a first oscillator tube having at least three grids, and a frequency-determining circuit connected thereto; a first bias circuit connected to said first series circuit and a grid of said first oscillator tube; a second bias circuit connected to said second series circuit and a grid of said second oscillator tube; a first biasing circuit-means including a pair of said grids of said first oscillator tube, said first biasing circuit-means comprising a potentiometer-resistor, and means for deriving a potential from said potentiometer-resistor and applying the last said potential to said input grid circuit of said first amplifier means; and a second biasing circuit-means including a pair of said grids of said second oscillator tube, said second biasing circuit-means comprising a potentiometer-resistor, and means for deriving a potential from the last said potentiometer-resistor and applying the last said potential to said input grid circuit of said second amplifier means.

6. A telephonic communicating system comprising, in combination, a plurality of stations including a first station and a second station; said first station comprising a first speaker means, and a first electronic-tube amplifier means comprising a pair of amplifier tubes in cascade, said first amplifier means having an input grid circuit to a first of said tubes and an output anode circuit from a second of said tubes, said second station comprising a second speaker means, and a second electronic-tube amplifier means comprising a pair of amplifier tubes in cascade, said second amplifier means having an input grid circuit to a first of the last said tubes and an output anode circuit from the second of the last said tubes; each of said input grid circuits comprising a signalling device comprising a microphone and a transformer; said first speaker means being connected in said output anode circuit of said second amplifier means; said second speaker means being connected in said output anode circuit of said first amplifier means; a first capacitor-rectifier series circuit connected to said output anode circuit of said first amplifier means; a second capacitor-rectifier series circuit connected to said output anode circuit of said second amplifier means; said first station comprising a first tube-oscillator comprising a first oscillator tube having at least three grids, and a frequency-determining circuit connected thereto; said second station comprising a second tube-oscillator comprising a second oscillator tube having at least three grids, and a frequency-determining circuit connected thereto; a first bias circuit connected to said first series circuit and a grid of said first oscillator tube; a second bias circuit connected to said second series circuit and a grid of said second oscillator tube; a first biasing circuit-means including a pair of said grids of said first oscillator tube, said first biasing circuit-means comprising a potentiometer-resistor, and means for deriving a potential from said potentiometer-resistor and applying the last said potential to said input grid circuit of said first amplifier means; a second biasing circuit-means including a pair of said grids of said second oscillator tube, said second biasing circuit-means comprising a potentiometer-resistor, and means for deriving a potential from the last said potentiometer-resistor and applying the last said potential to said input grid circuit of said second amplifier means, said first tube of each of said amplifier means comprising a screen grid; associated means for deriving a first rectified potentjal from the oscillations of said first tube-oscillator and a second rectified potential from the oscillations of said second tube-oscillator; and connecting circuit means for applying said first rectified potential to said screen grid of said second amplifier means and for applying said second rectified potential to said screen grid of said first amplifier means.

7. A telephonic communicating system as defined to claim 6 but further characterized by said associated means comprising a plurality electrodes inside each of said oscillator tubes, said connecting circuit means including said electrodes.

8. A telephonic communicating system as defined in claim 6 but further characterized by said associated means a separate triode connected to each of said oscillator tubes, said connecting circuit means including said triodes.

PIERRE JEANLIN.

REFERENCES CITED

The following references are of record in the file of this patent:

UNITED STATES PATENTS

| Number | Name | Date |
|---|---|---|
| 2,129,990 | Fremery | Sept. 3, 1938 |
| 2,236,645 | Levy | Apr. 1, 1941 |
| 2,296,626 | Blumlein | Sept. 22, 1942 |
| 2,366,011 | Donaldson | Dec. 26, 1944 |
| 2,515,726 | Montani | July 18, 1950 |
| 2,545,476 | Levy | Mar. 20, 1951 |
| 2,545,477 | Levy | Mar. 20, 1951 |